(12) United States Patent
Kuroda et al.

(10) Patent No.: US 7,403,348 B2
(45) Date of Patent: Jul. 22, 2008

(54) LENS ASSEMBLY FOR PROJECTING IMAGE

(75) Inventors: Yasuto Kuroda, Saitama (JP);
Masayuki Inamoto, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 113 days.

(21) Appl. No.: 11/528,382

(22) Filed: Sep. 28, 2006

(65) Prior Publication Data
US 2007/0076305 A1   Apr. 5, 2007

(30) Foreign Application Priority Data
Sep. 30, 2005   (JP) ............................... 2005-287171

(51) Int. Cl.
*G02B 7/02* (2006.01)
(52) U.S. Cl. .................. 359/823; 359/829; 359/819
(58) Field of Classification Search ......... 359/819–825, 359/694–704, 829, 830
See application file for complete search history.

(56) References Cited

U.S. PATENT DOCUMENTS 6,018,426 A * 1/2000 Funahashi ................ 359/819
6,469,840 B2 * 10/2002 Nomura et al. ............ 359/699
6,963,455 B2 * 11/2005 Nomura et al. ............ 359/694

FOREIGN PATENT DOCUMENTS

JP    2004-361620 A   12/2004

* cited by examiner

*Primary Examiner*—Mohammed Hasan
(74) *Attorney, Agent, or Firm*—Birch, Stewart, Kolasch & Birch, LLP

(57) ABSTRACT

A lens assembly includes plural lens components. A first lens element of the first lens component is aspherical and plastic, disposed on a side of a screen surface, for adjusting focus in image projection to the screen surface. A first lens barrel holds the first lens component. A second lens barrel holds a second lens component. A stationary barrel movably contains the second lens barrel. The second lens barrel is rotated helically relative to the stationary barrel, to adjust the focus for the plural lens components. Thereafter the first lens barrel is rotated helically relative to the second lens barrel, to correct image distortion for the plural lens components, and also to adjust a rotational position of the first lens element. So a gate mark on an edge portion of the first lens element is offset from an effective projecting region of the image projection.

7 Claims, 7 Drawing Sheets

FIG. 7

| SCREEN SIZE (INCH) | 43 | 55 | 73 |
|---|---|---|---|
| DISTANCE U (mm) FROM SCREEN 4 TO FLAT MIRROR 5 | 563 | 705 | 920 |
| DISTANCE P (mm) BETWEEN LENSES G1 & G2 | 4.95 | 4.66 | 4.39 |
| SHIFTING AMOUNT ΔP (mm) | 0.29 | 0.00 | -0.27 |
| DISTANCE M (mm) BETWEEN LENS G4 & REFLECTOR 26 | 26.70 | 26.49 | 26.31 |
| SHIFTING AMOUNT ΔM (mm) | 0.21 | 0.00 | -0.18 |
| ΔM/ΔP | 0.72 | | 0.67 |

LENS ASSEMBLY FOR PROJECTING IMAGE

BACKGROUND OF THE INVENTION

1. Field of the Invention

The present invention relates to a lens assembly for projecting an image. More particularly, the present invention relates to a lens assembly for projecting an image, in which positions of lens elements can be adjusted finely without lowering image quality of image projection.

2. Description Related to the Prior Art

A rear projection apparatus has been recently known as a display apparatus or TV set of a large display area. The rear projection apparatus includes a screen, a mirror, and an optical engine. The screen is supported on a casing. The mirror is disposed behind the screen. The optical engine is a projector component which projects projecting light toward the mirror. The optical engine includes illumination optics, a light valve, and projection optics. The illumination optics receive light from a high brightness light source to output uniform illuminating light. The light valve is an image forming device, and modulates the illuminating light to produce an original image electronically. The projection optics enlarge and project the projecting light in a manner having image information formed by the light valve.

An aspherical lens element can be included in a lens assembly for the projection optics. To produce the aspherical lens element, raw material is molded by injection molding into the product, examples of raw materials being a plastic material, glass or the like. However, a mold for the injection molding has a gate, which causes a gate mark to remain on the product of the aspherical lens element being plastic typically. Also, weld lines may remain on the injection molding as a flow of the molten plastic material. When one wishes to use of the aspherical lens element as a part of the projection optics, the aspherical lens element should be installed to offset positions of gate marks or weld lines from an effective projecting region of image projection. See JP-A 2004-361620. This is for preventing image quality from being lowered.

There has been a conception of a common use of the optical engine for a plurality of types of the rear projection apparatus different in the screen size, for the purpose of economizing production of the rear projection apparatus by considering the optical engine. The screen size can be changed by changing a distance from the projection optics to the screen. However, initial positioning of the optical engine is determined suitably for a specific size. If a user wishes to install the optical engine in a type of the rear projection apparatus different in the screen size, the focus must be adjusted. To this end, the projection optics are moved in the optical axis direction for the adjustment. To move the projection optics in the optical axis direction, the use of helical threads is effective. However, the gate marks or weld lines on the edge of the aspherical lens element of a plastic material are likely to exist within the effective projecting region for image projection. Also, offsetting of the aspherical lens element changes the degree of image surface distortion of projected images, to lower image quality of the projection.

SUMMARY OF THE INVENTION

In view of the foregoing problems, an object of the present invention is to provide a lens assembly for projecting an image, in which positions of lens elements can be adjusted finely without lowering image quality of image projection.

In order to achieve the above and other objects and advantages of this invention, a lens assembly has first and second lens components movable in a direction of an optical axis, the first lens component being constituted by a first lens element, being aspherical and plastic, and disposed on a side of a screen surface. A first lens barrel holds the first lens component. A second lens barrel holds the second lens component. A stationary barrel movably contains the second lens barrel. A first thread mechanism helically couples the first lens barrel with the second lens barrel, and in response to rotation of the first lens barrel relative to the second lens barrel, moves the first lens component in the optical axis direction with the first lens barrel, in order to correct image distortion. A second thread mechanism helically couples the second lens barrel with the stationary barrel, and in response to rotation of the second lens barrel relative to the stationary barrel, moves the first and second lens components in the optical axis direction with the first and second lens barrels, in order to adjust focus. The second lens barrel is rotated with the second thread mechanism to adjust the focus, and thereafter the first lens barrel is rotated with the first thread mechanism to correct the distortion, and also to adjust a rotational position of the first lens element, so as to offset a gate mark on an edge portion of the first lens element from an effective projecting region of image projection.

A rotational position of the first lens element according to correcting the distortion by use of the first thread mechanism is equal to or close to a rotational position of the first lens element before adjusting the focus by use of the second thread mechanism.

Furthermore, a first fastening mechanism fastens the first lens barrel on the second lens barrel upon setting in a predetermined position for the correction of the distortion. A second fastening mechanism fastens the second lens barrel on the stationary barrel upon setting in a predetermined position for the adjustment of the focus.

The at least one second lens element is a movable lens group having plural lens elements.

The second lens barrel includes a barrel sleeve inserted in the stationary barrel with the second thread mechanism. A barrel ring is formed on the barrel sleeve, and inserted in the first lens barrel with the first thread mechanism.

The first thread mechanism includes a first female helical thread formed inside the first lens barrel. A first male helical thread is formed on the barrel ring, and helically coupled with the first female helical thread. The second thread mechanism includes a second female helical thread formed inside the stationary barrel. A second male helical thread is formed on the barrel sleeve, and helically coupled with the second female helical thread.

The lens assembly is used in a projector, and projects light to the screen surface. The projector includes a light source for emitting the light. A light valve forms an image according to image data, and transmits or reflects the light toward the plural lens elements from the light source.

BRIEF DESCRIPTION OF THE DRAWINGS

The above objects and advantages of the present invention will become more apparent from the following detailed description when read in connection with the accompanying drawings, in which:

FIG. 7 is a table illustrating various dimensions in relation to plural screen sizes;

DETAILED DESCRIPTION OF THE PREFERRED EMBODIMENT(S) OF THE PRESENT INVENTION

Figure 1:
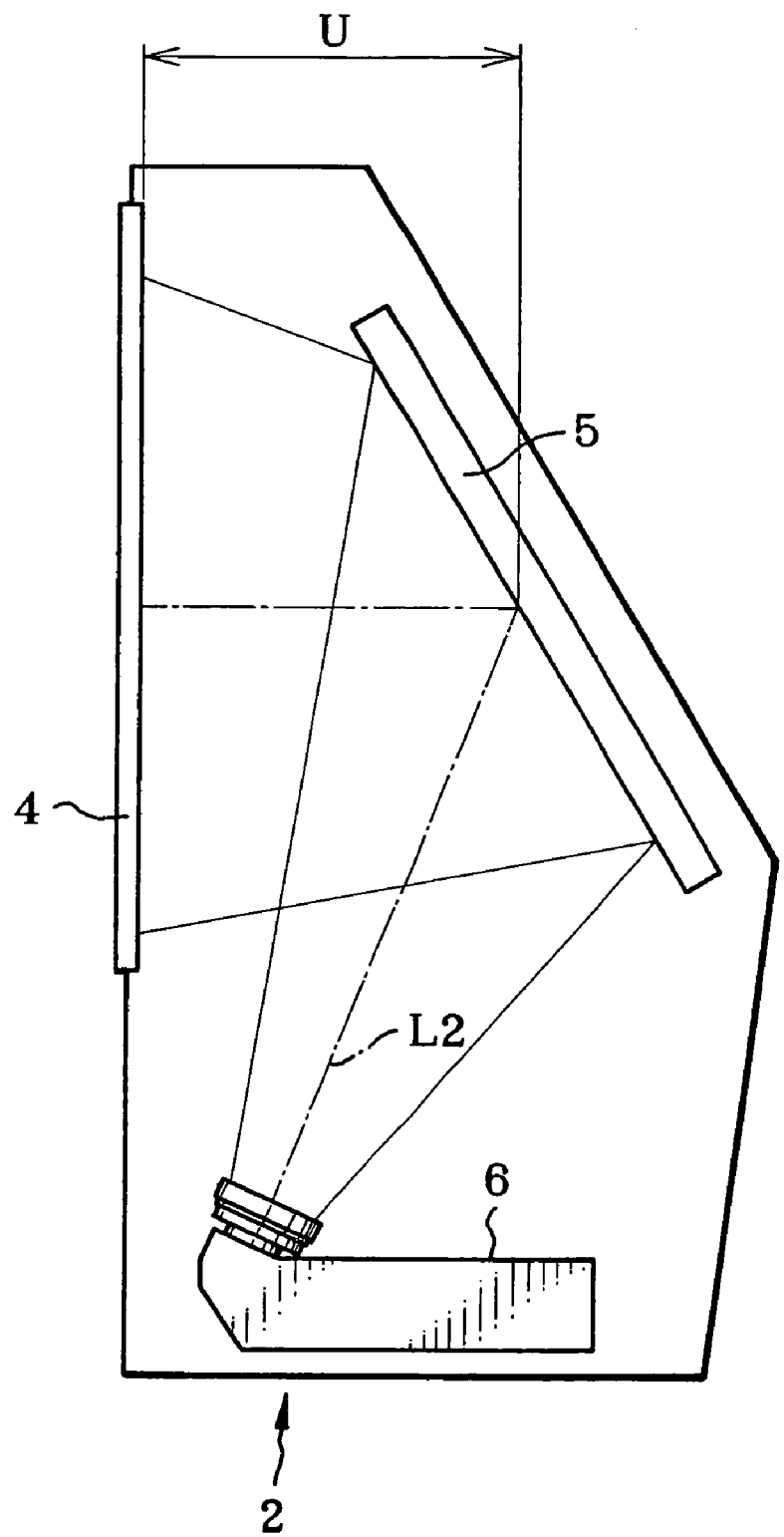
FIG. 1 is an explanatory view in elevation illustrating a rear projection apparatus.

In FIG. 1 a rear projection apparatus 2 includes a screen 4 as a projecting surface, a flat mirror 5, and an optical engine 6. A casing 3 of the rear projection apparatus 2 has a front face where the screen 4 is supported. The flat mirror 5 is disposed behind the screen 4. The flat mirror 5 is held with an inclination relative to the screen 4. The optical engine 6 is oriented to extend horizontally in contrast with the screen 4 extending vertically. Projecting light exited from the optical engine 6 travels upward with an inclination, and is reflected by the flat mirror 5 to project an image on the screen 4. On the outer side of the screen 4 is observable the projected image in a normal orientation, because the projected image of the inner side of the screen 4 is mirror-reversed horizontally.

The optical engine 6 is a commonly usable component between plural types of the rear projection apparatus 2 that are different in the screen size. A reference size of the screen size for an image for the optical engine 6 is 55.63 inches, or nominally 55 inches. If the optical engine 6 is used in a certain type of the rear projection apparatus 2 of which the screen size is different from 55.63 inches, then a distance from the screen 4 to the flat mirror 5 is changed to change the screen size.

Figure 2:
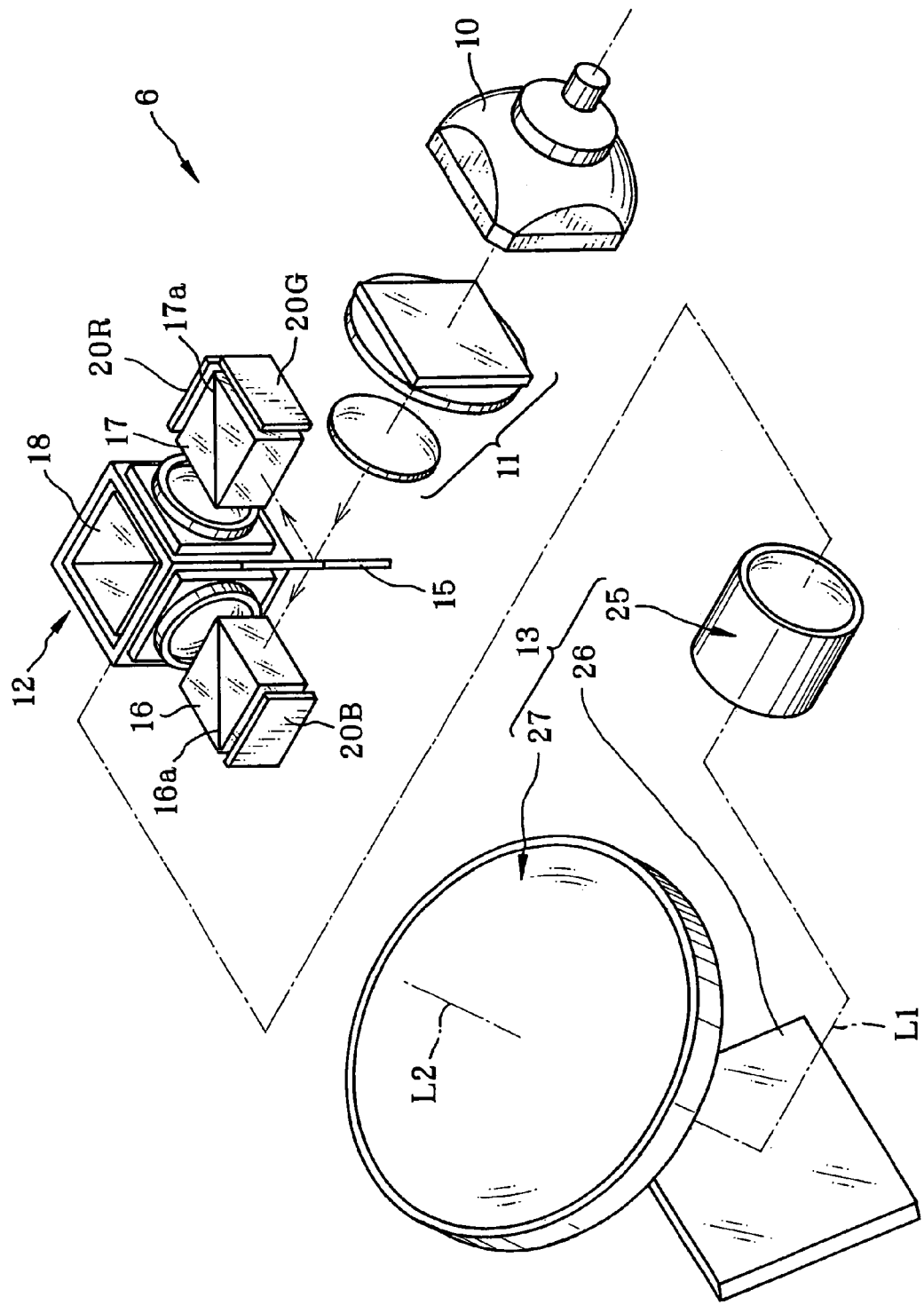
FIG. 2 is an exploded perspective view illustrating an optical engine.

In FIG. 2, the optical engine 6 is schematically illustrated. The optical engine 6 is constituted by a light source 10, illumination optics 11, color separating and color combining optics 12, and projection optics 13. The light source 10 is a high brightness light source device, such as a metal halide lamp, ultra high pressure mercury lamp, xenon lamp and the like. Light emitted by the light source 10 is passed through the illumination optics 11 and becomes illuminating light having uniformed intensity. The illumination optics 11 include a fly eye lens, a polarized light converting element, a condenser lens and the like.

The color separating and color combining optics 12 include a dichroic mirror 15, a polarization prism 16, a dichroic prism 17, and a color combining prism 18. The dichroic mirror 15 separates white illuminating light into components of blue illuminating light and yellow illuminating light. The blue illuminating light passes the dichroic mirror 15 to travel straight. The yellow illuminating light is reflected by the dichroic mirror 15 to travel on a path vertical to its initial path.

A polarization reflection surface 16a of the polarization prism 16 is inclined at 45 degrees relative to a direction of traveling of blue illuminating light. A blue light valve 20B of a liquid crystal display structure receives the light reflected by the polarization reflection surface 16a after passage through the dichroic mirror 15. Also, the polarization reflection surface 16a causes the blue projecting light reflected by the blue light valve 20B, the blue projecting light having image information.

A dichroic surface 17a is included in the dichroic prism 17 for separating yellow illuminating light from the dichroic mirror 15 into red and green illuminating light. A green light valve 20G of a liquid crystal display structure modulates green illuminating light reflected by the dichroic surface 17a to output green projecting light having image information. A red light valve 20R of a liquid crystal display structure modulates red illuminating light having passed the dichroic surface 17a to output red projecting light having image information. Green projecting light exited from the green light valve 20G passes through the dichroic surface 17a and travels straight. Red projecting light exited from the red light valve 20R is reflected by the dichroic surface 17a to travel on a path vertical to its initial path. Thus, components of the green and red projecting light are combined.

The color combining prism 18 combines blue projecting light from the polarization prism 16 and red projecting light and green projecting light from the dichroic prism 17, and outputs combined projecting light having a full color property.

A great number of pixels are arranged in a matrix form on the light valves 20B, 20G and 20R, and modulate illuminating light for each of pixels. The light valves 20B, 20G and 20R are display panels for forming an image two-dimensionally. Illuminating light of the primary colors is modified into projecting light with image information. The light valves 20B, 20G and 20R have a frame of a rectangular quadrilateral shape with an aspect ratio of 16/9. All of those are extended longitudinally in the horizontal direction.

The projection optics 13 include a rear lens assembly 25, a reflector 26 to change a path, and a front lens assembly 27 for projecting an image. Projecting light from the color separating and color combining optics 12 as composite light comes to enter the rear lens assembly 25. The projecting light passed through the rear lens assembly 25 is reflected by the reflector 26 for changing the path, to travel on the optical axis L2 distinct from the L1, and then comes to enter the front lens assembly 27. The front lens assembly 27 includes the first lens element G1 disposed nearer to the screen 4 than the remainder, and three lens elements G2, G3 and G4 as a movable lens group or lens component. Projecting light reflected by the reflector 26 comes to enter those, and then exits from the same to travel toward the flat mirror 5. A composite image formed by the light valves 20R, 20B and 20G is focused and formed on the screen 4 by the projection optics 13.

Figure 3:
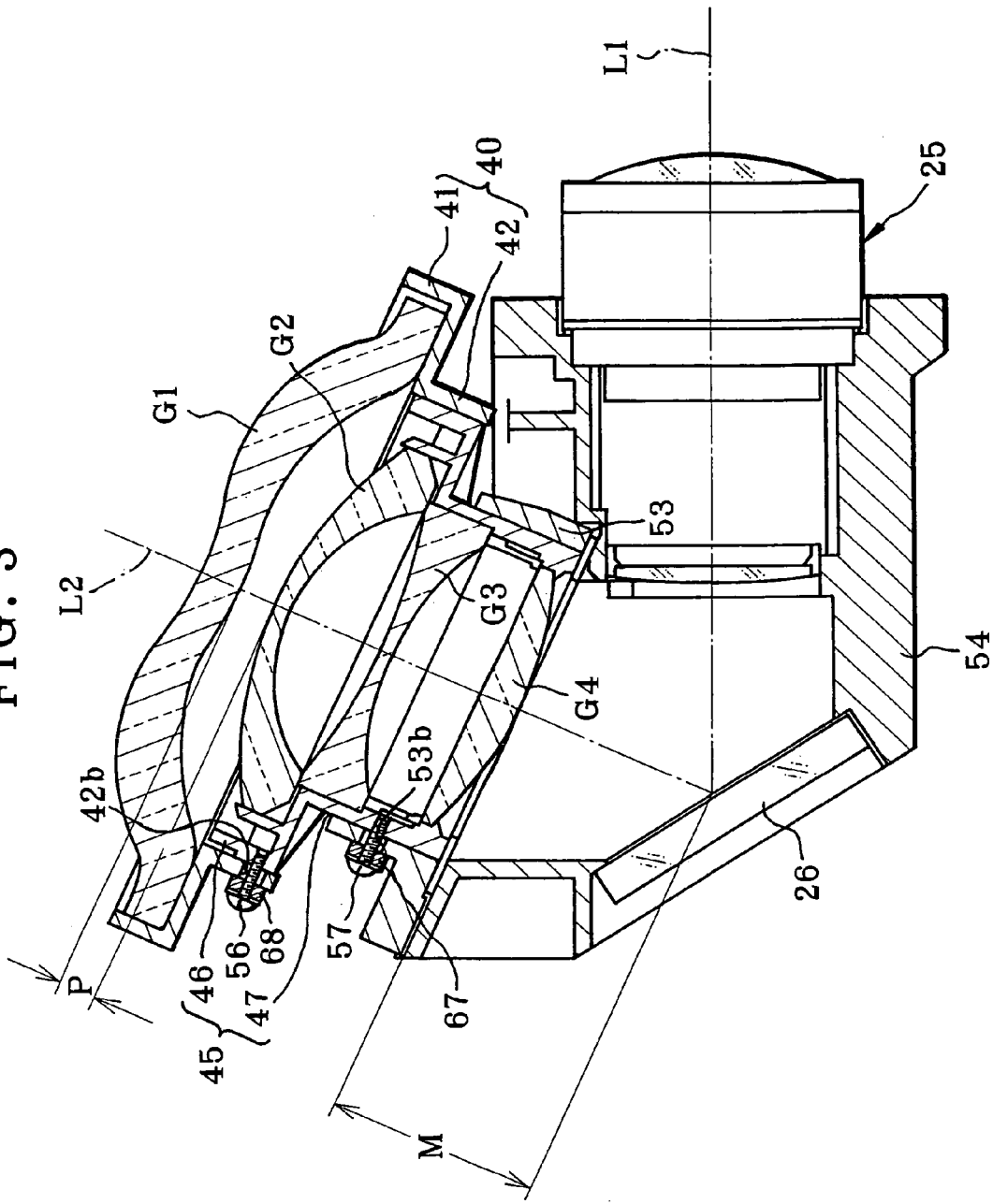
FIG. 3 is a vertical section illustrating projection optics.

In FIG. 3, the front lens assembly 27 includes the first lens element G1 and the movable lens group or lens component that contains the lens elements G2-G4. The first lens element G1 is used for correcting an image surface distortion. The first lens element G1 is an aspherical lens formed from a plastic material. A gate mark 31 exists on an edge portion of the first lens element G1 as a shape formed in the course of the injection molding because of a gate of a mold. See FIG. 5. Furthermore, weld lines are likely to exist on the first lens element G1 in a weld line region 32 near to the gate mark 31 or a weld line region 33 due to flow of resin. An effective projecting region 34 as viewed at the first lens element G1 is as indicated by the phantom line in FIG. 5. The weld line regions 32 and 33 are assembled in the optical engine 6 and kept offset from the effective projecting region 34.

Figure 4:
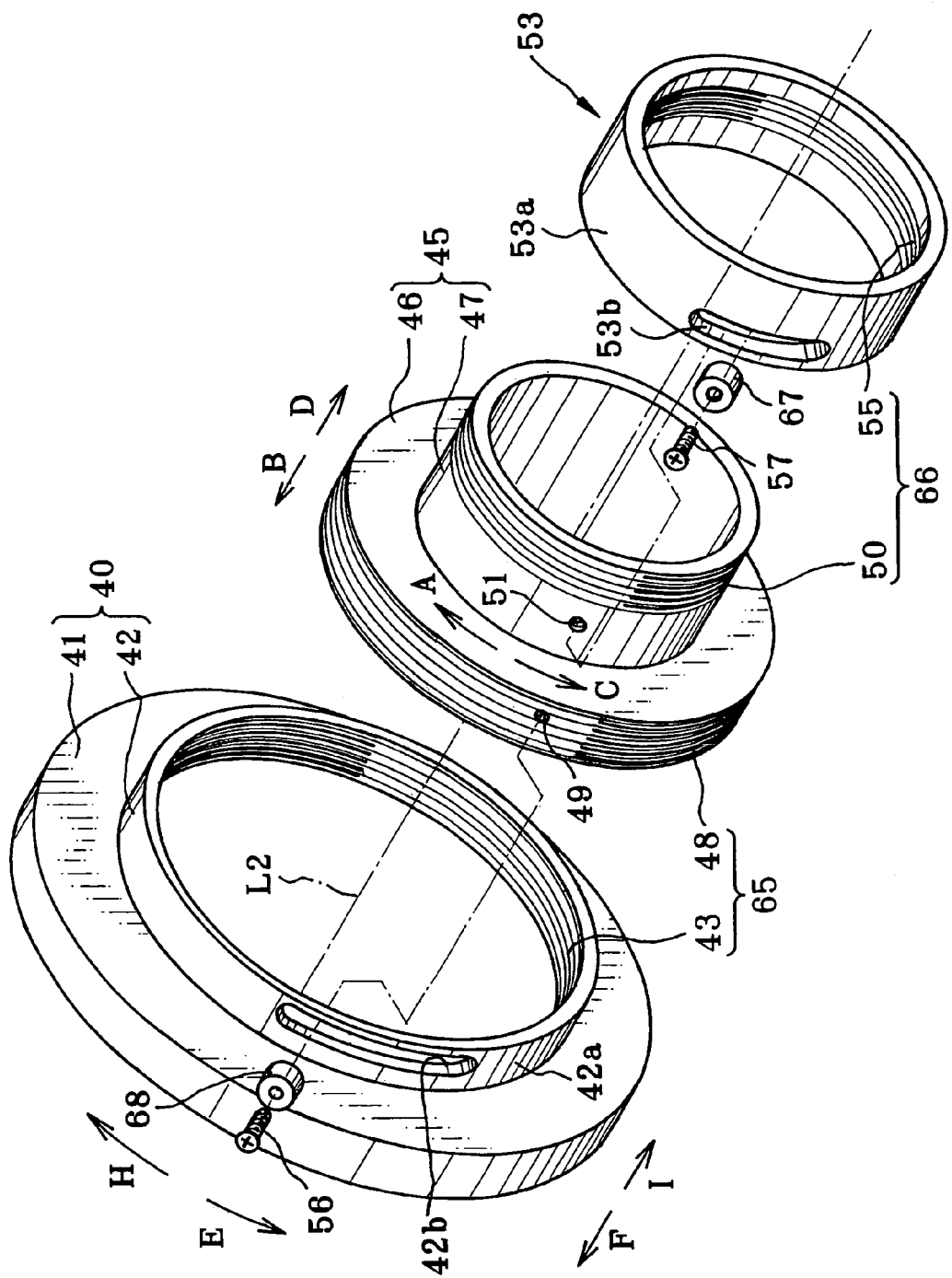
FIG. 4 is an exploded perspective view illustrating a moving mechanism for moving a front lens assembly.

In FIG. 4, elements for moving the projection optics 13 in the optical axial direction L2 are illustrated. A first lens barrel 40 is included in the projection optics 13. A barrel ring 41 and a barrel sleeve 42 constitute the first lens barrel 40, and have different diameters. The first lens element G1 is mounted in the barrel ring 41. A first female helical thread 43 is formed on the inner surface of the barrel sleeve 42. A peripheral surface 42a extends outside the barrel sleeve 42. A second lens barrel 45 is included in the projection optics 13. A barrel ring 46 is a portion of the second lens barrel 45. A screw hole 49 is formed in the barrel ring 46. A slot 42b is formed in the peripheral surface 42a. A fastening screw 56 is inserted in the slot 42b, and becomes secured in the screw hole 49.

The second lens barrel 45 includes a barrel sleeve 47 and the barrel ring 46 having a greater diameter than the barrel sleeve 47. The lens elements G2, G3 and G4 as a movable lens group or lens component are mounted in the combination of the barrel ring 46 and the barrel sleeve 47. See FIG. 3. A first male helical thread 48 is formed outside the barrel ring 46, and engageable helically with the first female helical thread 43 inside the barrel sleeve 42 of the first lens barrel 40. The screw hole 49 is formed in the barrel ring 46 for engagement with the fastening screw 56. A second male helical thread 50 is formed outside the barrel sleeve 47. There is a screw hole 51, in which a fastening screw 57 is helically secured.

A stationary barrel 53 is tightly fixed on a stationary frame 54 of FIG. 3. A second female helical thread 55 is formed on an inner surface of the stationary barrel 53 for helical coupling with the second male helical thread 50 on the barrel sleeve 47 of the second lens barrel 45. A peripheral surface 53a is defined outside the stationary barrel 53. A slot 53b is formed in the stationary barrel 53 through the peripheral surface 53a, and receives insertion of the fastening screw 57. A first thread mechanism 65 is constituted by the first female helical thread 43 inside the barrel sleeve 42 of the first lens barrel 40 and the first male helical thread 48 on the barrel ring 46 of the second lens barrel 45. A second thread mechanism 66 is constituted by the second female helical thread 55 inside the stationary barrel 53 and the second male helical thread 50 on the barrel sleeve 47 of the second lens barrel 45. The thread mechanisms 65 and 65 are previously constructed so that a direction of an inclination of helical shape of the second thread mechanism 66 is reverse to that of an inclination of helical shape of the first thread mechanism 65.

The optical engine 6 is compatible between plural types of the rear projection apparatus 2 with different screen sizes. As described above, a reference size of the screen size for the optical engine 6 is 55 inches. Failure is likely to occur in focusing of projecting light of the screen 4 if the optical engine 6 is assembled in a rear projection apparatus with a screen size different from 55 inches. However, in the invention, the second thread mechanism 66 is utilized to adjust focusing so as to focus the projecting light on the screen 4 by moving the projection optics 13 back or forth on the optical axis L2.

If the optical engine 6 is assembled in a type of the rear projection apparatus 2 having a screen size smaller than 55 inches, then the second lens barrel 45 is rotated in the direction A of FIG. 4, and is moved in the direction B toward the screen 4. If the optical engine 6 is assembled in a type of the rear projection apparatus 2 having a screen size more than 55 inches, then the second lens barrel 45 is rotated in the direction C of FIG. 4, and is moved in the direction D toward the reflector 26. After this, the fastening screw 57 is secured to fix the second lens barrel 45 on the stationary barrel 53. Note that a spacer or washer 67 is inserted, and has a diameter greater than a width of the slot 53b. In the course of adjusting the focus, the first lens barrel 40 rotates together with the second lens barrel 45 when the second lens barrel 45 rotates, because the first lens barrel 40 is kept secured to the second lens barrel 45.

After the focus is adjusted, the first thread mechanism 65 is utilized to move the first lens element G1 as an aspherical lens on the optical axis L2, to correct the image surface distortion in the projected image. When the second lens barrel 45 is moved toward the flat mirror 5 in the adjustment, the first lens barrel 40 is rotated in the direction E in FIG. 4, to move the first lens element G1 in the direction F or toward the screen 4. When the second lens barrel 45 is moved toward the reflector 26 in adjusting the focus, the first lens barrel 40 is rotated in the direction H in FIG. 4. The first lens element G1 is moved toward the reflector 26 and in the direction I in FIG. 4. After the adjustment, the first lens barrel 40 is fixedly secured to the second lens barrel 45 by the fastening screw 56. Note that a spacer or washer 68 is used, and has a diameter greater than a width of the slot 42b.

Figure 5:
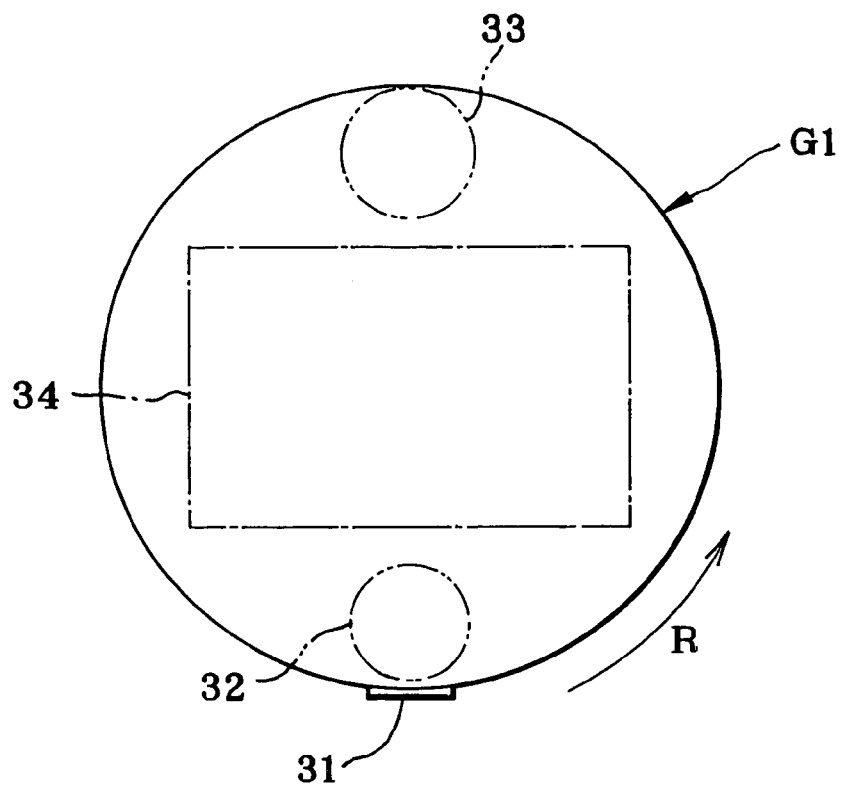
FIG. 5 is an explanatory view in elevation illustrating a first lens element retained in a reference position.
Figure 6:
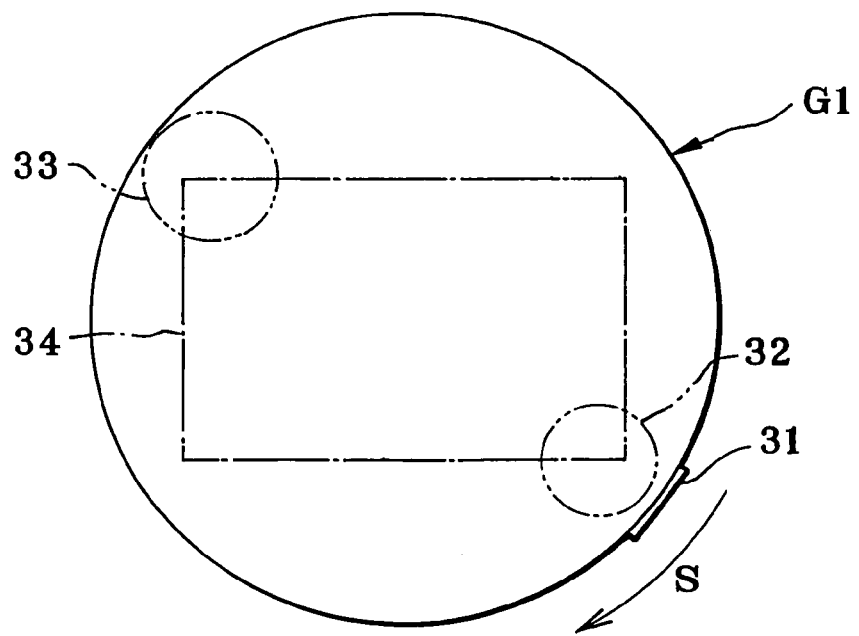
FIG. 6 is an explanatory view in elevation illustrating the first lens element after the focus adjustment.

When the focus is adjusted as illustrated in FIGS. 5 and 6, the first lens barrel 40 rotates in the direction R in FIG. 5 when the second lens barrel 45 rotates. Thus, a rotational position of the first lens element G1 becomes offset. This causes a shift of the position of the gate mark 31 and the weld line regions 32 and 33 of the first lens element G1 into the effective projecting region 34. However, the first lens barrel 40 is rotated in the direction S in FIG. 6 for correction of distortion at the first lens element G1. This can offset the gate mark 31 and the weld line regions 32 and 33 from the effective projecting region 34. It is easily possible to prevent image quality from being lowered.

Figure 8:
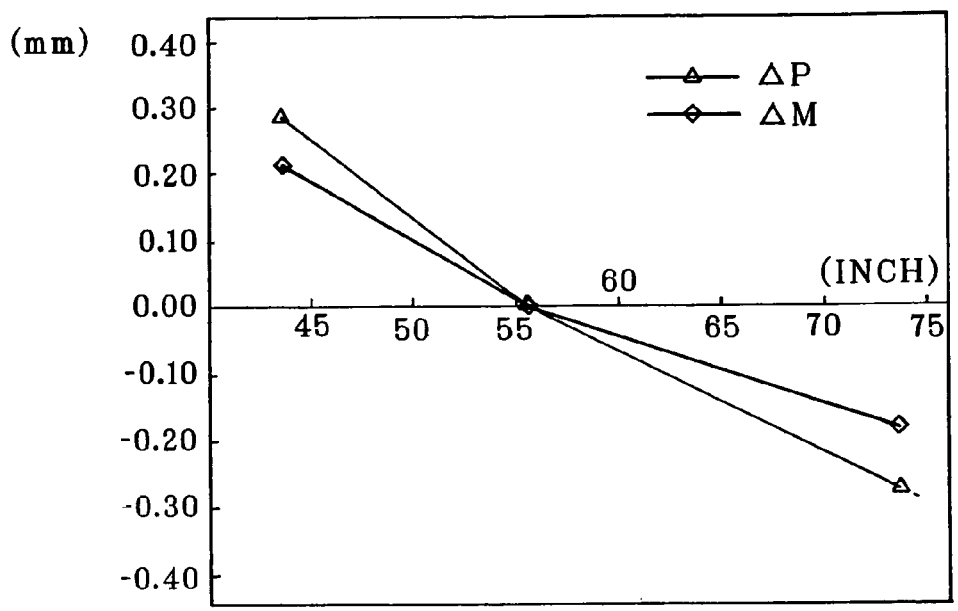
FIG. 8 is a graph illustrating shifting amounts in relation to plural screen sizes.
Figure 9:
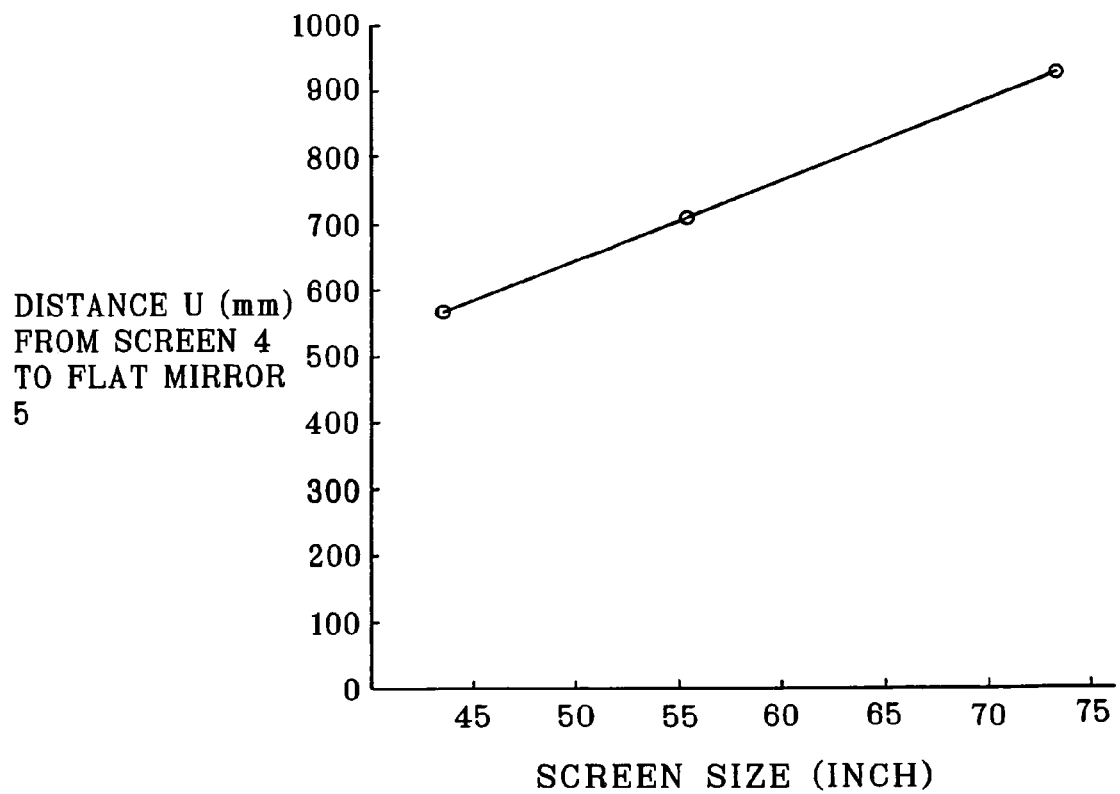
FIG. 9 is a graph illustrating a relationship between the screen to the flat mirror and the plural screen sizes.

When parts of the front lens assembly 27 are assembled, distances between lens elements are determined for values of screen sizes. In FIGS. 7, 8 and 9 for the optical engine 6 constructed according to 55 inches as screen size, a distance U from the screen 4 to the flat mirror 5 is 705 mm. A distance P between the first lens element G1 and the lens element G2 is 4.66 mm. A distance M between the lens element G4 and the reflector 26 is 26.49 mm.

If the optical engine 6 is assembled in a type of the rear projection apparatus 2 having a screen size of 43 inches, a distance U from the screen 4 to the flat mirror 5 is 563 mm. A distance P between the first lens element G1 and the lens element G2 is 4.95 mm. A distance M between the lens G4 and the reflector 26 is 26.70 mm. In adjusting the focus in combination with the size of 43 inches, the front lens assembly 27 in the optical engine 6 is shifted at an amount of ΔM=0.21 mm. In correcting the image surface distortion, the first lens element G1 as an aspherical lens is shifted at an amount of ΔP=0.29 mm.

If the optical engine 6 is assembled in a type of the rear projection apparatus 2 having a screen size of 73 inches, the distance U from the screen 4 to the flat mirror 5 is 920 mm. The distance P between the first lens element G1 and the lens element G2 is 4.39 mm. The distance M between the lens G4 and the reflector 26 is 26.31 mm. In adjusting the focus in combination with the size of 73 inches, the front lens assembly 27 in the optical engine 6 is shifted at an amount of ΔM=−0.18 mm. In correcting the distortion, the first lens element G1 is shifted at an amount of ΔP=−0.27 mm.

The first thread mechanism 65 is utilized to move the first lens barrel 40 on the optical axis L2. The second thread mechanism 66 is used to move the second lens barrel 45 on the optical axis L2. In correction of the distortion, it is necessary to offset the gate mark 31 on the first lens element G1 or the weld line regions 32 and 33 from the effective projecting region 34 while the first lens barrel 40 is moved on the optical axis L2. Values of leads R1 and R2 of respectively the thread mechanisms 65 and 66 are predetermined to satisfy the condition of:

$$X=|[(\Delta M/\Delta P) \cdot (R1/R2)]|=1$$

When X=1 is satisfied, the rotational position of the first lens element G1 can be set equal to the reference position when the distortion is corrected at the first lens element G1. The weld line regions 32 and 33 are offset from the effective projecting region 34. The image quality of projected images can be kept high without lowering. The ratio $\Delta M/\Delta P$ is 0.72 for the size of 43 inches, and is 0.67 for the size of 73 inches in contrast with the constant value of R1/R2 between the thread mechanisms 65 and 66. The equation $|[(\Delta M/\Delta P)\cdot(R1/R2)]|=1$ cannot be satisfied. However, the ratio $\Delta M/\Delta P$ can be approximated for the respective values of screen sizes, so that a rotational position of the first lens element G1 can be set sufficiently close to the reference position when the distortion is corrected at the first lens element G1. It is possible to offset the weld line regions 32 and 33 from the effective projecting region 34.

In the above embodiment, the rotational direction of the first lens barrel 40 for its movement in the forward direction is opposite to the rotational direction of the second lens barrel 45 for its movement in the forward direction. However, other structures may be used. A rotational direction of the first lens barrel 40 for its movement in the forward direction can be the same as a rotational direction of the second lens barrel 45 for its movement in the forward direction. The first lens barrel 40 is moved to adjust the focusing, the second lens barrel 45 being moved to adjust the distortion. Furthermore, the first thread mechanism 65 may have a helical shape in the equal direction to a helical shape of the second thread mechanism 66. For this structure, the second lens barrel 45 is rotated in the same direction as the first lens barrel 40.

In the above embodiment, the distortion is corrected after the adjustment of the focus. However, a reference size of a screen size in the rear projection apparatus 2 may be different from that according to the above. The optical engine 6 can be assembled in the rear projection apparatus 2 after adjusting positions of the lens elements G3 and G4. The sequence of the invention is the same as the above embodiment. The distortion is corrected by moving the first lens element G1 after the adjustment of the focus.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A lens assembly having first and second lens components movable in a direction of an optical axis, said first lens component being constituted by a first lens element, being aspherical and plastic, and disposed on a side of a screen surface, said lens assembly comprising:
   a first lens barrel for holding said first lens component;
   a second lens barrel for holding said second lens component;
   a stationary barrel for movably containing said second lens barrel;
   a first thread mechanism for helically coupling said first lens barrel with said second lens barrel, and for, in response to rotation of said first lens barrel relative to said second lens barrel, moving said first lens component in said optical axis direction with said first lens barrel, in order to correct image distortion;
   a second thread mechanism for helically coupling said second lens barrel with said stationary barrel, and for, in response to rotation of said second lens barrel relative to said stationary barrel, moving said first and second lens components in said optical axis direction with said first and second lens barrels, in order to adjust focus;
   wherein said second lens barrel is rotated with said second thread mechanism to adjust said focus, and thereafter said first lens barrel is rotated with said first thread mechanism to correct said distortion, and also to adjust a rotational position of said first lens element, so as to offset a gate mark on an edge portion of said first lens element from an effective projecting region of image projection.

2. A lens assembly as defined in claim 1, wherein a rotational position of said first lens element according to correcting said distortion is equal to or close to a rotational position of said first lens element before adjusting said focus.

3. A lens assembly as defined in claim 2, further comprising:
   a first fastening mechanism for fastening said first lens barrel on said second lens barrel upon setting in a predetermined position for said correction of said distortion; and
   a second fastening mechanism for fastening said second lens barrel on said stationary barrel upon setting in a predetermined position for said adjustment of said focus.

4. A lens assembly as defined in claim 2, wherein said second lens component includes plural lens elements.

5. A lens assembly as defined in claim 2, wherein said second lens barrel includes:
   a barrel sleeve inserted in said stationary barrel with said second thread mechanism; and
   a barrel ring, formed on said barrel sleeve, and inserted in said first lens barrel with said first thread mechanism.

6. A lens assembly as defined in claim 5, wherein said first thread mechanism includes:
   a first female helical thread formed inside said first lens barrel;
   a first male helical thread, formed on said barrel ring, and helically coupled with said first female helical thread;
   said second thread mechanism includes:
   a second female helical thread formed inside said stationary barrel; and
   a second male helical thread, formed on said barrel sleeve, and helically coupled with said second female helical thread.

7. A lens assembly as defined in claim 1, wherein said lens assembly is used in a projector including:
   a light source for emitting light;
   a light valve, disposed in a path between said light source and said first and second lens components, for forming an image according to image data for projection on said screen surface.

* * * * *